United States Patent

[11] 3,621,405

| [72] | Inventor | Walter N. Carlsen<br>Palo Alto, Calif. |
| --- | --- | --- |
| [21] | Appl. No. | 732,738 |
| [22] | Filed | May 28, 1968 |
| [45] | Patented | Nov. 16, 1971 |
| [73] | Assignee | Itek Corporation<br>Lexington, Mass. |

[54] SINUSOIDAL CONVERTER
11 Claims, 6 Drawing Figs.

[52] U.S. Cl. .................................................. 328/133,
328/155, 328/134, 307/233
[51] Int. Cl. .................................................. G01r 19/14
[50] Field of Search ...................................... 328/133,
155, 134; 307/233, 7

[56] References Cited
UNITED STATES PATENTS

| 2,777,055 | 1/1957 | Goldberg | 328/133 |
| --- | --- | --- | --- |
| 3,465,258 | 9/1969 | Wheatley | 328/133 |
| 3,337,814 | 8/1967 | Brase et al. | 328/134 |
| 2,774,872 | 12/1956 | Howson | 328/155 |
| 2,930,842 | 3/1960 | Leyton | 328/134 |
| 3,083,340 | 3/1963 | Nelson | 328/133 |
| 3,122,704 | 2/1964 | Jones | 328/134 |
| 3,219,935 | 11/1965 | Katakami | 328/133 |
| 3,309,539 | 3/1967 | Brosius | 328/155 |
| 3,315,028 | 4/1967 | Kool | 328/133 |
| 3,470,475 | 9/1969 | Peterson | 328/134 |

Primary Examiner—Donald D. Forrer
Assistant Examiner—Harold A. Dixon
Attorneys—Homer O. Blair, Robert L. Nathans and Harvey G. Lowhurst ABSTRACT: A sinusoidal converter for converting an input voltage into a voltage whose magnitude varies as the sine or cosine of a phase shift caused by the input voltage. A first oscillator is caused to shift the phase of its output signal with relation to that of a second reference oscillator by an amount proportional to the magnitude of the input voltage. The outputs of the first and second oscillators are then applied to phase detection means having sinusoidal output characteristics, and output signals are produced which correspond to the sine and cosine of a phase shift caused by the input voltage.

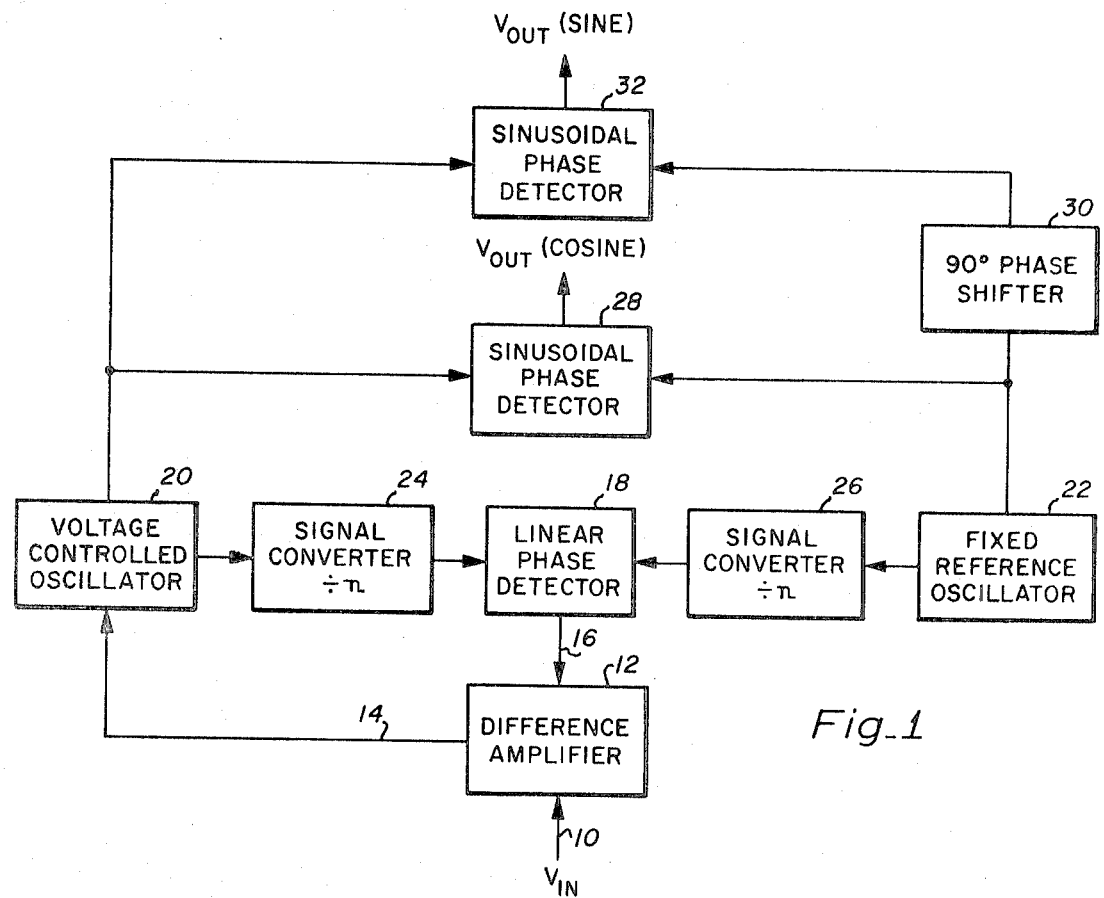
Fig_1
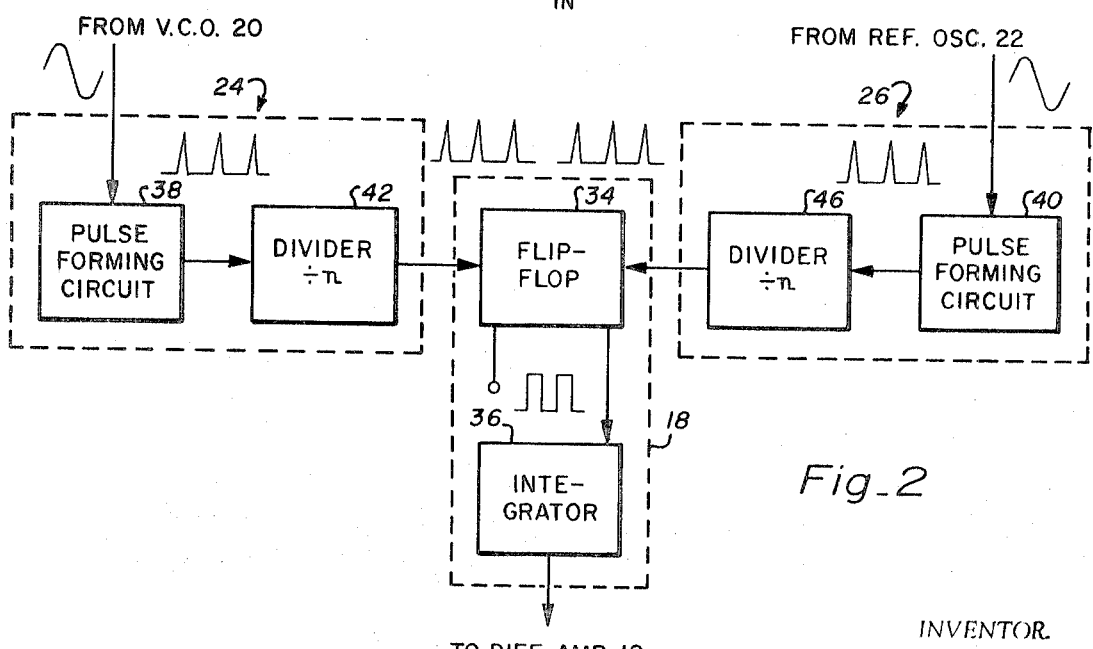
Fig_2
INVENTOR
WALTER N. CARLSEN
BY
ATTORNEY

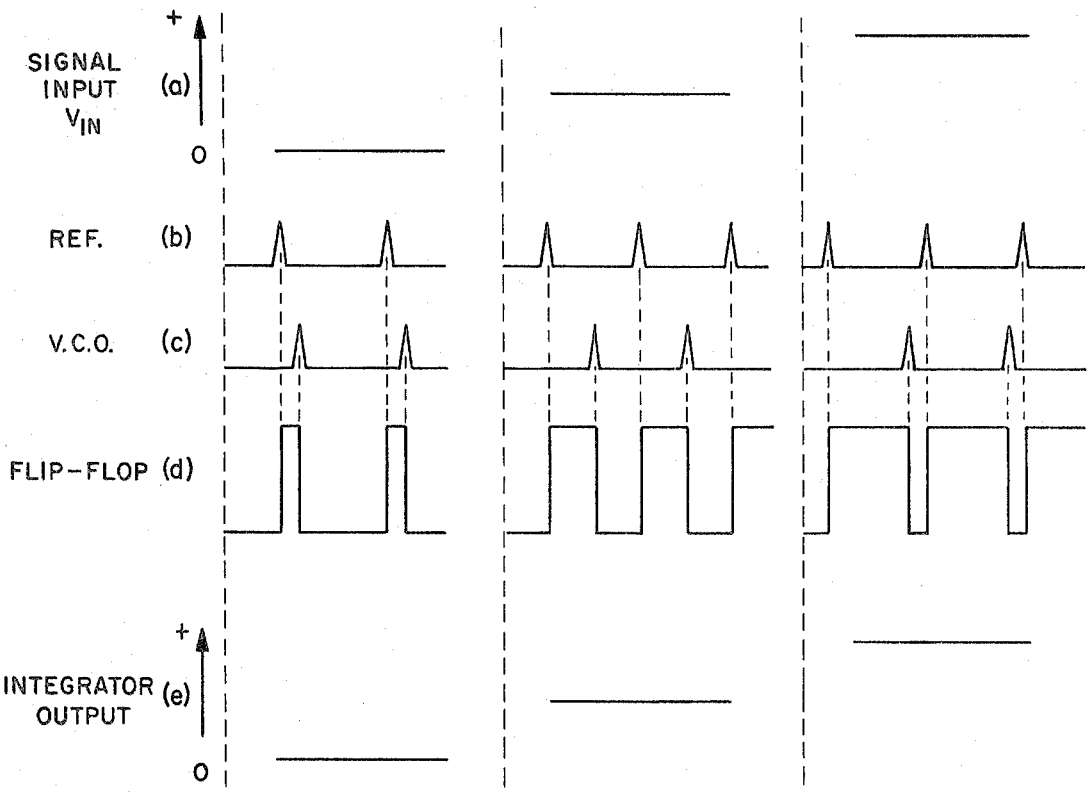
Fig_4   Fig_5   Fig_6
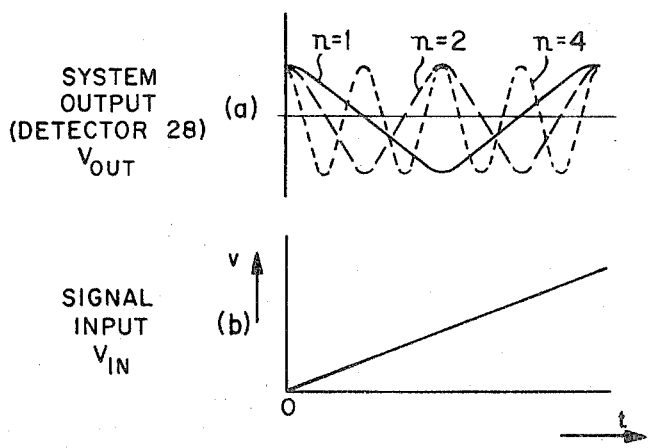
Fig_3

3,621,405

SINUSOIDAL CONVERTER

The present invention relates generally to signal conversion apparatus, and, more particularly, to a system for converting a variable DC input voltage into an output voltage whose magnitude varies as the sine or cosine of the input voltage signal.

BACKGROUND OF THE INVENTION

In present day technology, there are many occasions in which it is desirous that a means be available for converting a DC signal into some other type of communicative indicia whether it be for control purposes, communication purposes or otherwise. The prior art is replete with such devices both mechanical and electronic; however, although numerous types of mechanical means have been developed for converting a DC signal to a sinusoidally varying signal, very few electronic means of this type have been developed.

In one particular application where it is necessary to convert rotational data, obtained in the form of a DC voltage, into a more suitable sinusoidal form, it has been the practice to use mechanical wave shaping apparatus to perform the conversion. In other areas of application various types of electromechanical signal conversion means have been used as resolvers, function generators and polar to rectangular coordinate converters just to name a few. In many of these areas of application, it would be much more advantageous to have a completely electronic means with which to perform the signal conversion.

OBJECTS OF THE INVENTION

It is therefore a principal object of the present invention to provide an entirely electronic system by which DC signal information can be converted directly into a sinusoidal form.

Another object of the present invention is to provide an electronic system whereby a sine or cosine function can be obtained in response to a linearly varying voltage signal.

Still another object of the present invention is to provide an electronic signal conversion apparatus which is capable of converting a DC input voltage into a voltage which varies as the sine or cosine of the input voltage without the use of mechanical signal conversion means.

Still other objects and advantages of the present invention will become apparent after having read the following detailed disclosure of a preferred embodiment which is shown in the drawing wherein:

BRIEF DESCRIPTION OF THE DRAWING

FIG. 1 is a block diagram of one embodiment of the present invention;

FIG. 2 is a block diagram illustrating in more detail certain components of the system of FIG. 1;

FIG. 3 is an illustration showing alternative output signals obtained for a given input signal using the present invention; and FIGS. 4-6 are timing diagrams illustrating the operation of the present invention.

DESCRIPTION OF THE PREFERRED EMBODIMENT

Referring now to FIG. 1 of the drawing, a preferred embodiment of the invention will be described. An input voltage signal $V_{in}$, which may be either a steady state voltage or a time varying voltage, is applied to an input terminal 10 of a difference amplifier 12 which provides an error signal on lead 14 equal to the difference in magnitude between $V_{in}$ and another signal input at 16. The value of the signal transmitted to difference amplifier 12 through lead 16 is determined by a phase detector 18 which compares the phase of the output signals produced by a pair of oscillators 20 and 22.

Oscillator 20 is a voltage controlled oscillator (VCO) which may, for example, be a conventional Clapp circuit with a varactor diode in the frequency determining circuit, or may be any other suitable signal generating device of which the phase of its output signal is shifted in response to an input voltage. Oscillator 22 is a fixed frequency reference oscillator which may be crystal controlled, or of any other suitable type which produces a stable fixed frequency output.

An output of both controlled oscillator 20 and reference oscillator 22 are fed to linear phase detector 18 through suitable signal conversion means 24 and 26 respectively, the operation and purpose of which will be described hereafter. Phase detector 18 then compares the phase of the signals received from converters 24 and 26 and produces a DC output voltage at 16, the magnitude of which is proportional to the phase difference between the compared signals.

It should be noted that the circuit including difference amplifier 12, oscillator 20, converter 24 and phase detector 18 forms a phase lock circuit which causes the phase of controlled oscillator 20 to be locked to the phase of reference oscillator 22 when $V_{in}$ is of zero voltage. Likewise, the phase difference between the outputs of oscillators 20 and 22 is maintained constant when the inputs 10 and 16 to difference amplifier 12 are equal. If the signal input voltage $V_{in}$ changes to some value different from that at the input 16, an error signal is generated on lead 14 which causes oscillator 20 to shift the phase of its output signal until phase detector 18 produces a voltage on lead 16 which equals the input signal $V_{in}$ to again reduce to zero the error signal transmitted to oscillator 20.

The effect then, of the circuit thus far described, is to cause the phase of the signal generated by oscillator 20 to vary proportionally from that of the reference oscillator 22 by an amount directly proportional to the change in magnitude of the signal input voltage $V_{in}$. Thus, by comparing the phase of the outputs of the oscillators 20 and 22, using a phase detector 28 having a sinusoidal output characteristic, an output signal $V_{out}$ can be obtained in response to an input $V_{in}$ which can be represented by the expression $$V_{out} = \cos k\, V_{in}$$

where $k=n(d\Phi/dv)$, $n$ is the division factor of signal converters 24 and 26, and $d\Phi/dv$ is the ratio of phase shift to control voltage of linear phase detector 18. Phase detectors 28 and 32 may be balanced mixer circuits which have a sinusoidal output characteristic.

By providing a 90° phase shifter 30 in the output of reference oscillator 22 and comparing the orthogonally shifted signal with that of oscillator 20 using a phase detector 32, one can obtain an output which varies as the sine of the input voltage $V_{in}$, i.e., $$V_{out} = \sin k\, V_{in}.$$

Referring now to FIG. 2, a more detailed description of apparatus for performing the frequency conversion and linear phase detection functions will be given. The linear phase detector 18 may, in simplified form, include a flip-flop 34 which provides a rectangular wave output in response to a pair of input signals, the duration of each rectangular wave output signal being determined by the time intervals separating the respective input signals. In order to convert the rectangular wave output to a DC voltage which is proportional to the time spacing between the input signals, a simple integrator circuit 36 is provided, which in effect integrates the area under the rectangular wave output signal.

Since the flip-flop 34 cannot respond directly to a pair of sinusoidal input signals, and in some cases it is desirable to reduce the frequency of the input signals before applying them to the flip-flop, a pair of signal converters 24 and 26 are provided. The converters 24 and 26 include pulse forming circuits 38 and 40 which are provided for receiving the outputs of the controlled oscillator 20 and the reference oscillator 22 respectively, and converting them to suitable pulse form. These circuits may be squaring circuits, or may simply comprise a means which provides a short pulse each time the input sinusoid crosses the zero axis. The converters also include dividers 42 and 46 which in their simplest form comprise one or more flip-flops which provide one output pulse for each n input pulse, where n is a positive integer. The purpose of the dividers, as more fully explained below, is to divide the frequency of the signals generated by the VCO 20 and reference oscillator 22 by a factor n in order to extend the range of output signals over which the system is capable of responding.

In operation, with no signal ($V_{in}=0$) applied to difference amplifier 12 at input 10, the VCO 20 is caused to generate an output signal which is of the same frequency and phase as reference generator 22 due to the phase locking characteristics of the system. But when an input voltage $V_{in}$ is applied an input 10, the difference amplifier 12 produces an error signal which causes the phase of the output of VCO 20 to be shifted with reference to that of the oscillator 22 and an output voltage $V_{out}$ is obtained which is related to $V_{in}$ in accordance with one of the aforementioned equations.

As illustrated in FIG. 2, the sinusoidal outs of VCO 20 and reference oscillator 22 are converted to pulse form by circuits 38 and 40, and the pulsed signals are passed through divider networks 42 and 46 which reduce the number of pulses by a factor n. The pulsed signals are then applied to flip-flop 34 of linear detector 18 whereby they cause a signal to be generated which is related to the difference in the time of arrival at flip-flop 34 of the pulses produced by converter 24 as compared to those produced by converter 26. And since the respective pulse trains are time related to the phases of the outputs of VCO 20 and oscillator 22, the signal generated by flip-flop 34 is directly related to the phase difference between the outputs of VCO 20 and oscillator 22.

In order to convert the flip-flop output to a form which can be received by difference amplifier 12, and integrator 36 is provided which converts the square wave to a DC signal. The integrator may, for example, consist of a simple RC filter having a low-pass characteristic which provides a smoothing action and, in effect, performs an integration of the signal passed through it.

Thus, the effect of the above-described operation is to cause the VCO 20 to perform a shift in the phase of its generated signal which is directly related to the amplitude of the input signal $V_{in}$. Then, by comparing the phase of the signals generated by oscillators 20 and 22, using sinusoidal phase detectors 28 and 32, sinusoidal output signals $V_{out}$ can be generated, in either the sine or cosine mode, which bear a direct relationship to the input voltage $V_{in}$.

As a specific example of the system operation, when $V_{in}$ is a linearly increasing DC potential, reference is made to FIGS. 3–6. In part (b) of FIG. 3, the linearly increasing input voltage is shown. Superimposed above the input signal, in part (a), there are indicated the types of output signals $V_{out}$ which are produced for different values of n. In FIGS. 4–6, the internal operation of the phase lock circuit is shown for three different values of the input signal $V_{in}$ (part (a)) as $V_{in}$ is increased linearly.

In parts (b), the pulse train, which corresponds to that produced by converter 26 in accordance with the output of reference oscillator 22, is depicted, and in parts (c) the similar output corresponding to that of VCO 20 is shown. Parts (d) represent the output generated by the flip-flop 34 of detector 18, and parts (e) show the corresponding integrated signal produced by integrator 36. It will be noted that, as the signal input voltage is increased (parts (a) of FIGS. 4, 5 and 6 viewed sequentially), the position of the pulses in parts (c) shift rightwardly with respect to the reference pulses of parts (b) and since, as indicated in parts (d), the flip-flop 34 is gated ON by the "(b)" pulses and OFF by the "(c)" pulses, the width of the rectangular wave output generated thereby is increased in accordance with the magnitude of the signals of parts (a). By integrating the area under these rectangular waves, signals are obtained, as shown in parts (e), which follow the input signal of parts (a). Thus, as indicated, the circuit functions to cause the phase of the signal generated by the VCO 20 to vary in direct relation to the magnitude of the input signal $V_{in}$.

By further increasing the voltage shown in FIG. 6(a) and thus shifting the position of the "(c)" pulses pass shown in FIG. 6, it will be noted that as the "(c)" pulses pass the position of the reference pulses, the width of the rectangular waves drop back to zero, and the integrated output indicated in part (e) likewise drops to zero. Obviously, the oscillator 20 will no longer be required to follow the signal input on a 1 to 1 basis. It is for this reason that the frequency dividers are required.

The distance between the consecutive pulses shown in parts (b) and (c) of FIGS. 4–6 correspond to 180° of phase difference where there is no division by the dividers (i.e., n=1), and since the flip-flop type of detector is operationally limited to phase shifts of 180° in the inputs it sees, it will be apparent that by removing some of the pulses by division the phase locking circuit can actually be caused to function within any actual range of phase shift in VCO 20 simply by choosing the appropriate division ratio n. Therefore, the range of signal input $V_{in}$ to which the system is responsive can be selected at will.

While the invention has been described with particular reference to a single embodiment, it is apparent that many alterations and modifications may be made to the system without departing from the merits thereof. It is to be understood that this description is for purposes of illustration only, and is in no way intended to be limiting in any way, and furthermore, I intend that the appended claims be interpreted as covering all modifications which fall within the true spirit and scope of my invention.

What is claimed is:

1. A signal converter for converting a varying input signal into a sinusoidal representation thereof, and comprising:
    a. first signal-generating means for generating a periodically fluctuating reference signal;
    b. second signal-generating means for generating a periodically fluctuating controlled signal;
    c. means, responsive to the varying input signal, for causing the phase of said controlled signal to vary relative to the phase of said reference signal in accordance with said input signal, and including, a first phase detector means for comparing the phase of said reference signal with the phase of said controlled signal and for generating an output signal which varies according to the difference in phase between said reference signal and said controlled signal, a comparison means for comparing the output signal from said first phase detector means with said varying input signal and for generating a signal indicative of the comparison, and means for causing the phase of said controlled signal to vary relative to the phase of said reference signal in response to said signal generated by said comparison means; and
    d. sinusoidal phase detector means for comparing the phase of said reference signal with the phase of said controlled signal and for producing an output signal which varies in accordance with a trigonometric function of the difference in angular phase between said reference signal and said controlled signal.

2. Apparatus as set forth in claim 1 wherein said trigonometric function is the cosine of the difference in angular phase between said reference signal and said controlled signal.

3. Apparatus as set forth in claim 1 wherein said trigonometric function is the sine of the difference in angular phase between said reference signal and said controlled signal.

4. Apparatus as set forth in claim 1 wherein said sinusoidal phase detector means includes a balanced mixer circuit.

5. Apparatus as set forth in claim 1 wherein:
    a. said first phase detector means includes means for generating an output signal, the magnitude of which varies according to the difference in phase between said reference signal and said controlled signal; and
    b. said comparison means includes a means for detecting the difference in magnitude between the output signal of said first phase detector means and the varying input signal.

6. Apparatus as set forth in claim 5 wherein said trigonometric function is the cosine of the difference in angular phase between said reference signal and said controlled signal.

7. Apparatus as set forth in claim 5 wherein said trigonometric function is the sine of the difference in angular phase between said reference signal and said controlled signal.

8. Apparatus as set forth in claim 5 wherein said sinusoidal phase detector means includes a balanced mixer circuit.

9. Apparatus as set forth in claim 1 wherein said means for causing the phase of said controlled signal to vary includes:
 a. first signal converter means for dividing said reference signal by a factor of $n$ and for producing an output signal indicative thereof;
 b. second signal converter means for dividing said controlled signal by the same factor of $n$ and for producing an output signal indicative thereof; and
 c. said first phase detector means is responsive to the output signals from said first and second signal converter means.

10. Apparatus as set forth in claim 9 wherein:
 a. said first phase detector means includes means for generating an output signal, the magnitude of which varies according to the difference in phase between said reference signal and said controlled signal; and
 b. said comparison means includes a means for detecting the difference in magnitude between the output signal of said first phase detector means and the varying input signal.

11. Apparatus as set forth in claim 10 wherein said sinusoidal phase detector means includes a balanced mixer circuit.

* * * * *